United States Patent [19]
Masui et al.

[11] Patent Number: 5,843,568
[45] Date of Patent: Dec. 1, 1998

[54] FIBER-REINFORCED ARTICLE AND A METHOD FOR PRODUCING THE SAME

[75] Inventors: Syohei Masui, Kyoto; Masahito Matsumoto; Satoru Funkakoshi, both of Osaka, all of Japan

[73] Assignee: Sumitomo Chemical Company, Limited, Osaka, Japan

[21] Appl. No.: 914,797

[22] Filed: Aug. 20, 1997

[30] Foreign Application Priority Data

Aug. 20, 1996 [JP] Japan .................................. 8-218289

[51] Int. Cl.⁶ .............................. B32B 5/26; B32B 5/32; B29C 33/48
[52] U.S. Cl. .................... 428/317.9; 264/45.2; 264/45.3; 264/45.5; 264/241; 428/109; 428/113; 428/318.6; 428/318.8; 428/319.7
[58] Field of Search ..................................... 428/109, 113, 428/317.9, 318.6, 318.8, 319.7; 264/45.2, 45.3, 45.5, 241

[56] References Cited

U.S. PATENT DOCUMENTS

| | | | |
|---|---|---|---|
| 4,911,970 | 3/1990 | Rodenbeck et al. | 428/317.9 X |
| 5,049,439 | 9/1991 | Robinson | 428/317.9 |
| 5,098,778 | 3/1992 | Minnick | 428/317.9 X |
| 5,281,376 | 1/1994 | Hara et al. | |

FOREIGN PATENT DOCUMENTS

| | | |
|---|---|---|
| 481 306 A1 | 4/1992 | European Pat. Off. . |
| 658 410 A2 | 6/1995 | European Pat. Off. . |
| 7-216126 A | 8/1995 | Japan . |

*Primary Examiner*—James J. Bell
*Assistant Examiner*—Blaine R. Copenheaver
*Attorney, Agent, or Firm*—Pillsbury Madison & Sutro LLP

[57] ABSTRACT

A fiber-reinforced article includes an expanded core layer having opposing first and second surfaces with a thickness defined therebetween. The expanded core layer is formed from a composition comprising a thermoplastic material and fibers with average length of not less than about 1 mm, with at least a portion of the fibers being coated with the thermoplastic material. The fibers collectively define a network structure in which the fibers are interconnected with each other and fixed relative to each other via the thermoplastic material so that the coated fibers define interstitial voids therebetween. The article further includes first and second skin layers, the first skin layer having a surface integrally connected to the first surface of the expanded core layer and the second skin layer having a surface integrally connected to the second surface of the expanded core layer.

24 Claims, 5 Drawing Sheets

FIBER-REINFORCED ARTICLE AND A METHOD FOR PRODUCING THE SAME

BACKGROUND OF THE INVENTION

1. Field of the Invention

The present invention relates to a fiber-reinforced article and a method for producing the same.

2. Description of the Related Art

Heretofore, a foamed resin article formed from a thermoplastic resin has been well known. The foamed resin article basically comprises two skin layers, each of which is substantially free of voids, and a core layer which has a cell structure and is connected to the two skin layers. These foamed resin articles have both light weight and high strength, particularly high bending rigidity. In the cell structure, there are a lot of fine cells (foams) in the thermoplastic resin. The cells are substantially uniformly dispersed in the core layer, such that the number of cells existing per unit weight of the core layer is approximately constant even if an expansion ratio of the core layer is varied. Therefore, when the expansion ratio becomes larger, a wall between the cells becomes thinner. As a result, when the expansion ratio is larger than about 2, the strength of the foamed resin article is reduced.

Improving the strength of the foamed resin article by incorporating fibers, for example glass fibers, in the thermoplastic resin has been attempted. However, according to an investigation conducted by the present inventors, the conventionally used fibers have an average length of from about 50 $\mu$m to about 300 $\mu$m. When a thermoplastic resin containing such fibers is foamed, although mechanical strength of skin layers is improved, the core layer of the resulting foamed resin article has insufficient mechanical strength.

Therefore, despite these and other efforts, foamed thermoplastic articles having fiber-reinforced core layers which exhibit satisfactory mechanical strength are still desired.

SUMMARY OF INVENTION

It is, therefore, an object of the present invention to provide a fiber-reinforced expanded resin article which has both excellent strength, particularly excellent bending rigidity, and light weight, even if the article has a high expansion ratio.

In accordance with the principles of the present invention, this object is obtained by providing a fiber-reinforced article comprising an expanded core layer and first and second skin layers. The expanded core layer has opposing first and second surfaces with a thickness defined therebetween. The expanded core layer is formed from a composition comprising a thermoplastic material and fibers having average length of not less than 1 mm, with at least a portion of the fibers being coated with the thermoplastic material. The fibers collectively define a network structure in which the fibers are interconnected with each other and fixed relative to each other via the thermoplastic material so that the coated fibers define interstitial voids therebetween.

The first skin layer has a surface integrally connected to the first surface of the expanded core layer and the second skin layer has a surface integrally connected to the second surface of the expanded core layer. Each of the two skin layers is formed from a composition comprising a thermoplastic material and fibers with average length of not less than about 1 mm. The fiber-reinforced article has an average expansion ratio of from about 1.5 to about 3.5.

An another object of the present invention is to provide a method for producing the above-mentioned fiber-reinforced article of the present invention.

These and other objects, features, and advantages of the present invention will become apparent from the following detailed description when taken in conjunction with the accompanying drawings which illustrate, by way of example, the principles of the present invention.

DETAILED DESCRIPTION OF INVENTION

Figure 2:
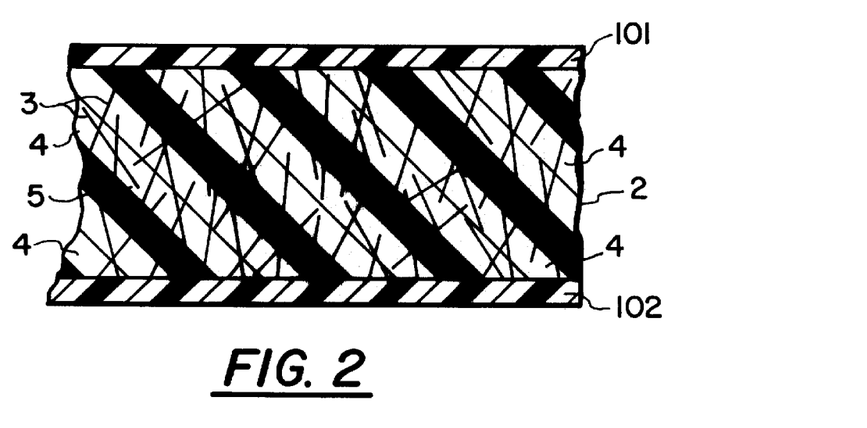
FIG. 2 is a schematic cross-sectional view of a fiber-reinforced article of the present invention having an expanded core layer with a network structure.

Referring now more particularly to the drawings, there is shown in FIG. 2 a fiber-reinforced article of the present invention having a first skin layer 101, a second skin layer 102 and an expanded core layer with opposing first and second surfaces. The expanded core layer comprises a network structure formed by a thermoplastic material 4 and fibers 3 having average length of not less than about 1 mm. At least a portion of the fibers is coated with the thermoplastic material. Here, the network structure is a structure in which the fibers are interconnected with each other and fixed relative to each other via the thermoplastic material so that the coated fibers define interstitial voids 5 therebetween. In the network structure, each fiber has an imaginary line passing through first and second ends of the fiber along a longitudinal axis of the fiber. The fiber-reinforced article of the present invention can be produced by processes described below. In the expanded core layer of the fiber-reinforced article obtained by such processes, it is preferred that a majority of the imaginary lines are arranged not more than 45 degrees relative to a direction in which at least one of a first and a second mold members was moved in the production processes.

Figure 13:
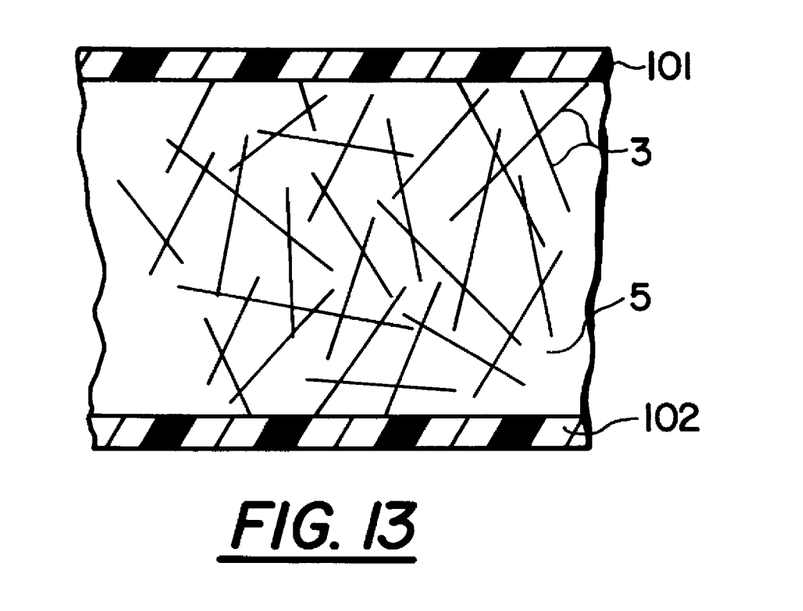
FIG. 13 is a schematic cross section of the expanded core layer of the fiber-reinforced article of the present invention in which fibers are not bundled to each other.
Figure 14:
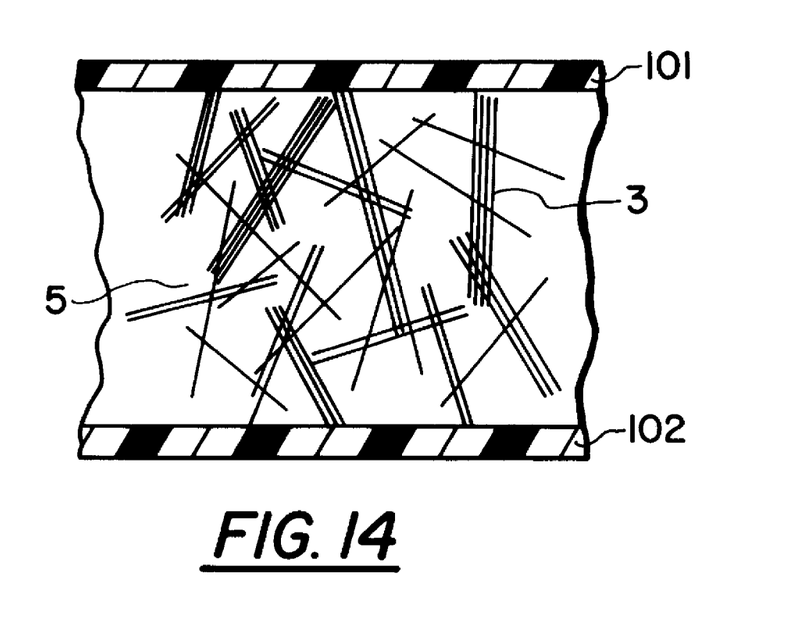
FIG. 14 is a schematic cross section of the expanded core layer of the fiber-reinforced article of the present invention in which fibers are bundled to each other.

In the fiber-reinforced article of the present invention, each fiber is not required to exist independently. (See FIG. 13, in which the fibers are not bundled.) For example, if the fibers are substantially uniformly dispersed in the expanded core layer, some of the fibers may be bundled to each other, as shown in FIG. 14.

The expanded core layer in the fiber-reinforced article of the present invention has a cell structure which is quite distinct, and thus different, from that observed with the conventional fiber-reinforced foamed articles. A fiber-reinforced article according to the present invention has the above-defined network structure. The network structure results in excellent strength of the fiber-reinforced article. In order that the fiber-reinforced article has the network structure in the expanded core layer, an average expansion ratio of the fiber-reinforced article should be in a range of from about 1.5 to about 3.5, preferably within a range of from about 1.8 to about 3.5. The average expansion ratio of the fiber-reinforced article means a ratio of an apparent volume of the article relative to a true volume of the solid material (without the interstitial voids) contained in the article.

In order for the fibers to interconnect with each other in the expanded core layer, the average length of the fibers should not be less than about 1 mm, preferably is in a range of from about 1 mm to about 50 mm, and more preferably is in a range of from about 1.5 mm to about 20 mm. If the average length of the fibers is less than about 1 mm, the network structure cannot be formed and the fiber-reinforced article has insufficient strength. In order to further improve the excellent strength of the expanded core layer, it is preferred that fibers having length of not less than about 3 mm are contained in the expanded core layer in a range of from about 20% to about 100%, more preferably in a range of from about 30% to about 100% relative to the total number of fibers contained in the expanded core layer. The lengths of the fibers contained in the expanded core layer can be measured by burning a predetermined amount of the expanded core layer to gather resultant ashes and then measuring the average length of fibers in the ashes by using a microscope.

A content of the fibers in the composition forming the fiber-reinforced article is important. When the content is too small, the strength of the skin layers and the expanded core layer becomes insufficient. On the other hand, when the content is too large, the fibers cannot be firmly fixed with the thermoplastic material and the expanded core layer does not exhibit sufficient strength. Therefore, the composition contains generally from about 10% to about 60% by weight, preferably from about 20% to about 40% by weight of the fibers relative to the total weight of the fibers and the thermoplastic material.

When the fibers are too thin or too thick, the expanded core layer formed by the process does not have sufficient strength. Therefore, the fibers should have an average diameter generally in a range of from about 5 $\mu$m to about 30 $\mu$m, preferably within a range of from about 10 $\mu$m to about 20 $\mu$m.

Although various fibers conventionally used for reinforcing a resin such as, for example, glass fibers and carbon fibers are applicable as the fibers in the present invention, glass fibers are generally used. Better adhesive properties between the fibers and the thermoplastic material causes the fibers to be more firmly fixed with the thermoplastic material, and as a result, the strength of the fiber-reinforced article is improved. Therefore, when the fibers have insufficient adhesive properties relative to the thermoplastic material, for example, when glass fibers and polypropylene-based resin are used, a surface treatment of the fibers or addition of a modifier to the thermoplastic material is effective for improving the adhesiveness between the fibers and the thermoplastic material. Various thermoplastic resins and thermoplastic elastomers which are conventionally used in an extrusion molding, an injection molding, a press molding and the like are applicable as the thermoplastic material in the present invention. Examples of suitable thermoplastic materials include conventional thermoplastic resins such as, for example, polyethylene, polypropylene, polystyrene, acrylonitrile-styrene-butadiene copolymer, poly(vinyl chloride), polyamide, polycarbonate and polyethylene terephthalate; mixture thereof; and polymer alloys formed from the above-mentioned resins. The composition forming the fiber-reinforced article may contain one or more additives such as, for example, a filler and an antioxidant. The resin contained in the composition forming the skin layers and the resin contained in the composition forming the expanded core layer can be basically the same, although the amount of the residual foaming agent in each composition may differ.

Each of the skin layers is generally formed by contacting a molten expandable composition comprising a foaming agent, the thermoplastic material and the fibers with one of the mold surfaces in a manufacturing process. The skin layers are substantially free of the interstitial voids and their outer surfaces are generally smooth. The skin layers may contain interstitial voids, which preferably constitute less than about 1% by volume of the total volume of the skin layers. The thickness of each of the skin layers is preferably not more than about 20%, more preferably not more than 10%, of the thickness of the fiber-reinforced article.

Detailed below is a method for producing the fiber-reinforced article of the present invention.

According to a first embodiment of this method, at least the following steps are performed:

(A) A molding apparatus having a first mold member and a second mold member is provided. Each of the mold members has a mold surface which opposes the mold surface of the other mold member, and at least one of the mold members is movable relative to the other mold member.

(B) A molten expandable composition comprising a thermoplastic material, fibers with average length of not less than about 1 mm, and a foaming agent is prepared.

(C) The molten expandable composition is supplied to a cavity defined between the opposing mold surfaces. The cavity has a first volume during the supplying step. The first volume of the cavity is within a range of from about 0.3 to about 0.65 times a predetermined volume of the fiber-reinforced article, so that the cavity is filled with the molten expandable composition.

(D) One or more of the mold members is moved relative to the other mold member to provide the cavity with a second volume that is equal to the predetermined volume of the fiber-reinforced article.

(E) The second volume of the cavity defined between the opposing mold surfaces is maintained as the molten expandable composition expands to fill the cavity.

Figure 3:
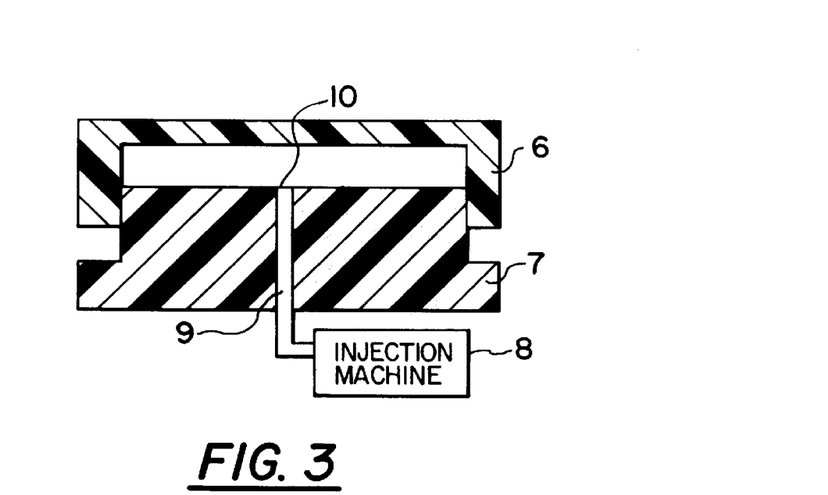
FIG. 3 is a schematic cross-sectional view of an apparatus for producing a fiber-reinforced article of the present invention.

A schematic view of a molding apparatus which can be used for the above-mentioned method is shown in FIG. 3. In this method, a molding apparatus having a first mold member 6 and a second mold member 7 is used. Each of the mold members has a mold surface which opposes the mold surface of the other mold member. At least one of the mold members is movable relative to the other mold member. In general, an injection machine 8 capable of supplying the molten expandable composition 11 comprising fibers, a thermoplastic material and a foaming agent to the molding apparatus is used. In general, at least one resin path 9 is provided in at least one of the mold members. One end of the resin path is connected to the injection machine 8 and another end of the resin path is connected to a resin feeding opening 10 which opens in a mold surface of a mold member in which the resin path is provided. The molten expandable composition 11 is supplied into a cavity defined between the opposing mold surfaces through the resin feeding opening 10. The resin feeding opening 10 is equipped with a valve (not shown) which can be arbitrarily opened and closed. Supply of the molten expandable composition 11 into the cavity can be started by opening the valve and can be stopped by closing the valve.

In this method, the molten expandable composition comprising the thermoplastic material, the fibers with an average length of not less than about 1 mm, and a foaming agent is prepared. In general, the fibers in the composition should be sufficiently long so that the network structure is obtained in the core expanded layer. The average length of the fibers is in principle up to about 50 mm, and preferably is in a range of from about 1.5 mm to about 20 mm. The molten expandable composition can be prepared by, for example, melt-kneading the foaming agent and a solid comprising the thermoplastic material and fibers with an average length of not less than about 3 mm, preferably from about 3 mm to about 50 mm, in a kneading machine. Kneading conditions should be established so that the average length of the fibers can be maintained not less than about 1 mm, and preferably that the number of fibers having a length of not less than about 3 mm is in a range of from about 20% to 100% relative to the total number of fibers contained in the composition. The molten expandable composition may contain one or more gases generated by the decomposition of the foaming agent. Said injection machine may be used as the kneading machine. An example of a suitable injection machine is Injection Machine NN450MI manufactured by Niigata Engineering Co., Ltd. Pellets comprising the thermoplastic material and the fibers with an average length of not less than about 3 mm can be used as said solid. The pellets can be prepared by impregnating a molten thermoplastic material into roved fibers, and then cooling and cutting the fibers into appropriate length, for example, from about 3 mm to about 50 mm. Foaming agents which are conventionally used for foaming a thermoplastic resin can be used as the foaming agent in the present invention.

At least one compound selected from an inorganic foaming agent such as, for example, sodium bicarbonate and an organic foaming agent such as, for example, azodicarbonamide, p-toluene hydrazide, N,N'-dinitrosopentamethylenetetramine (DNPT), 4,4'-oxybis (benzenesulphonyl hydrazide) and hydrazodicarbonamide can be used as the foaming agent. Azodicarbonamide and sodium bicarbonate are preferably used. The solid and the foaming agent can be fed into the kneading machine such as, for example, a conventional in-line type injection machine and melt-kneaded in a conventional manner. In the melt-kneading, if necessary, a thermoplastic material containing no fibers may be incorporated in order to adjust a concentration of the fibers in the molten expandable composition. The solid and the foaming agent may be separately fed into the injection machine or may be fed together after mixing with each other. The amount of the foaming agent added may be determined by taking into account one or more of the following factors: the desired expanding ratio and/or density of the fiber-reinforced article; the content, average length and/or average diameter of the fibers in the molten expandable composition; and the type, melting point and/or melt-viscosity of the thermoplastic material; and the like. The amount of the foaming agent is generally within a range of from about 1% to about 10% by weight relative to the thermoplastic material. Since it is important that the average length of the fibers in the fiber-reinforced article of the present invention is not less than about 1 mm, a condition where the average length of the fibers can be maintained in the above-mentioned range and the foaming agent can be sufficiently dispersed should be selected, when melt-kneading of the solid and the foaming agent is conducted. In general, at least a portion of the foaming agent is decomposed by heat which is added from outside of the kneading machine or generates by shearing of the thermoplastic material so that one or more gases generate during the melt-kneading. In general, the generated gas is sealed in the molten expandable composition under pressure.

Figure 5:
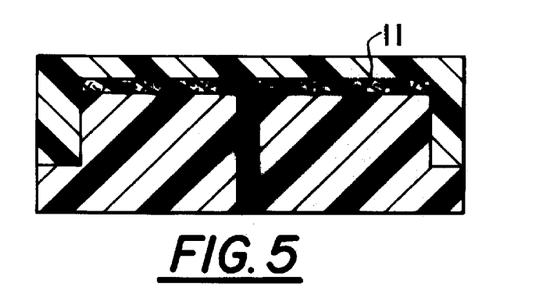
FIG. 5 shows the apparatus of FIG. 3 at another stage of the method for producing a fiber-reinforced article according to the first embodiment of the present invention.

The molten expandable composition, in which the gas is prevented from expanding by pressure applied by the thermoplastic material, is temporarily accumulated in the injection machine. And then, as shown in FIG. 5, the molten expandable composition is supplied into a cavity defined between the opposing mold surfaces through the resin feeding opening 10, so that the cavity is filled with the molten expandable composition. The cavity has a first volume during the supplying step.

Although the first volume of the cavity depends on an expansion ratio of a desired fiber-reinforced article, it is generally within a range of from about 0.3 to about 0.65 times the predetermined volume of the desired fiber-reinforced article. According to this method, a fiber-reinforced article whose average density is within a range of from about 0.3 to about 0.65 times an average density of the skin layers can be obtained. In general, the average density of the skin layers is approximately equal to the density of the molten expandable composition which was used for the method and has not expanded.

When the cavity has been filled with the molten expandable composition, the molten expandable composition is in a substantially non-foamed state. And at the same time, the fibers in the molten expandable composition maintain their average length at not less than about 1 mm and are entangled with each other.

As mentioned above, each of the skin layers is generally formed by contacting the molten expandable composition against the mold surfaces. The portion of the molten expandable composition in contact with the mold surfaces almost immediately begins to solidify the form the skin layers. The skin layers are substantially free of voids, since the mold members have not yet been moved to the second volume to permit expansion of the gas.

After the step of supplying the molten expandable composition into the cavity is completed, at least one of the mold members is moved to provide the cavity with a second volume that is equal to the predetermined volume of the fiber-reinforced article. If the period of time elapsed from after the step of supplying the molten expandable composition into the cavity is completed to before at least one of the mold members starts moving is too long, solidification of a portion of the molten expandable composition, which portion contacts with the mold surfaces, excessively proceeds during the period and as a result a sufficient expansion ratio cannot be achieved. Therefore, it is preferable to start moving at least one of the mold members within about 3 seconds after completing the step of supplying the molten expandable composition. The step of moving at least one of the mold members may be started at the same time that the step of supplying the molten expandable composition to the cavity is completed.

While the second volume of the cavity is maintained, a gas which was generated by decomposition of the foaming agent and sealed in the molten expandable composition expands. As a result, the molten expandable composition is expanded to fill the cavity. Here, at an interior portion of the molten expandable composition where a solidification has not proceeded sufficiently, the molten expandable composition expands so that the network structure is formed.

In general, after the cavity with the second volume has been filled with the thus expanded composition, the expanded composition is cooled and substantially solidified to form the fiber-reinforced article in the cavity, while the second volume of the cavity is maintained. At least one of the mold members is then moved relative to the other in order to open the molding apparatus and permit the thus formed fiber-reinforced article to be removed. By preference, the process can be conducted so that the same mold members are being moved in each of the method steps, including in this latter step.

A second embodiment of the method for making the fiber-reinforced article of the present invention includes at least the following steps:

(A) A molding apparatus having a female mold member and a male mold member is provided. Each of the mold members have a mold surface which opposes the mold surface of the other mold member. At least one of the mold members is movable relative to the other mold member.

(B) A molten expandable composition comprising a thermoplastic material, fibers with average length of not less than about 1 mm, and a foaming agent is prepared. The volume of the molten expandable composition is in a range of from about 0.3 times to about 0.65 times a predetermined volume of the fiber-reinforced article.

(C) The molten expandable composition is supplied to the cavity defined between the opposing mold surfaces. The cavity has a first volume during the supplying step, the first volume of the cavity being larger than the volume of the molten expandable composition.

(D) At least one of the mold members is moved so that a volume of the cavity is made the same as the volume of the molten expandable composition and the cavity is filled with the molten expandable composition.

(E) At least one of the mold members is moved to provide the cavity with a second volume that is equal to the predetermined volume of the fiber-reinforced article.

(F) The second volume of the cavity defined between the opposing mold surfaces is adjusted so that the molten expandable composition expands to fill the cavity.

Figure 7:
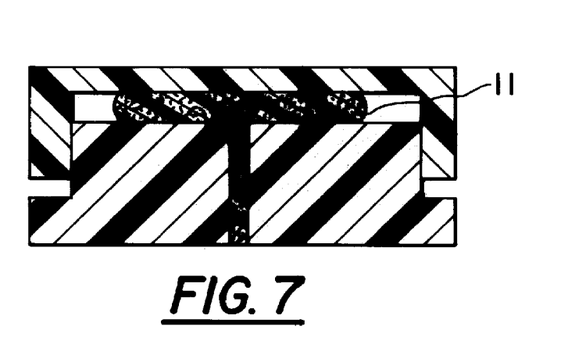
FIG. 7 shows the apparatus of FIG. 3 at a stage of the method for producing a fiber-reinforced article according to a second embodiment of the present invention.
Figure 8:
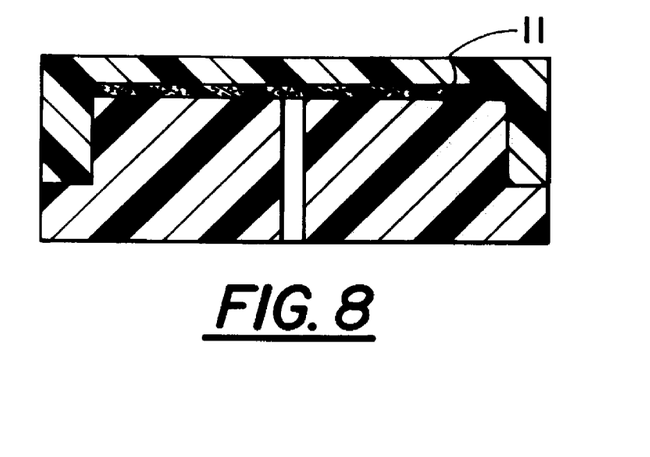
FIG. 8 shows the apparatus of FIG. 3 at another stage of the method for producing a fiber-reinforced article according to the second embodiment of the present invention.
Figure 9:
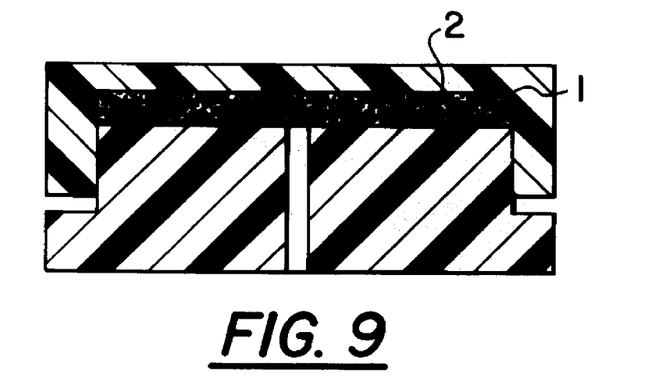
FIG. 9 shows the apparatus of FIG. 3 at still another stage of the method for producing a fiber-reinforced article according to the second embodiment of the present invention.

In this method, as shown in FIG. 7, the molten expandable composition whose volume is within a range of from about 0.3 times to about 0.65 times a predetermined volume of the fiber-reinforced article is fed into a cavity with a first volume which is larger than the volume of the molten expandable composition. And then, at least one of the mold members is moved, so that the cavity is filled with the molten expandable composition, as shown in FIG. 8. Next, at least one of the mold members is moved to provide the cavity with a second volume that is equal to the predetermined volume of the fiber-reinforced article, as shown in FIG. 9. And then, the molten expandable composition is expanded to fill the cavity while maintaining the second volume of the cavity. In general, after the cavity with the second-volume has been filled with the thus expanded composition, the expanded composition is cooled and substantially solidified to form the fiber-reinforced article in the cavity, while the second volume of the cavity is maintained. Then, at least one of the mold members is moved to open the molding apparatus and the thus formed fiber-reinforced article is removed from the molding apparatus.

Figure 10:
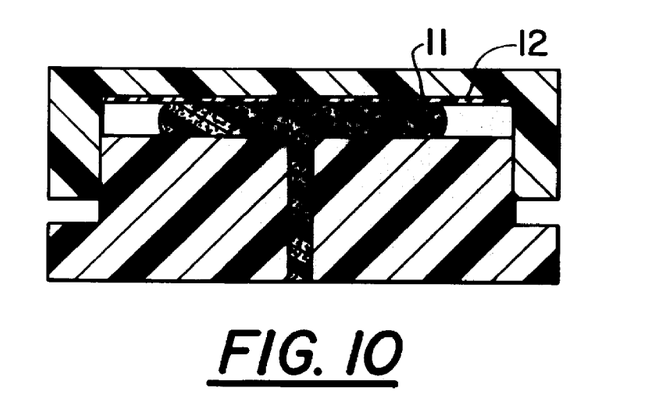
FIG. 10 shows the apparatus of FIG. 3 at a stage of the method for producing a fiber-reinforced article laminated with a covering material of the present invention.

In the first and second embodiments of this method, by placing at least one covering material 12 on at least a portion of at least one of the opposing mold surfaces before supplying the molten expandable composition into the cavity as shown in FIG. 10, a fiber-reinforced article, wherein on at least a portion of at least one of the first and second layers the covering material is laminated, can be obtained.

Figure 1:
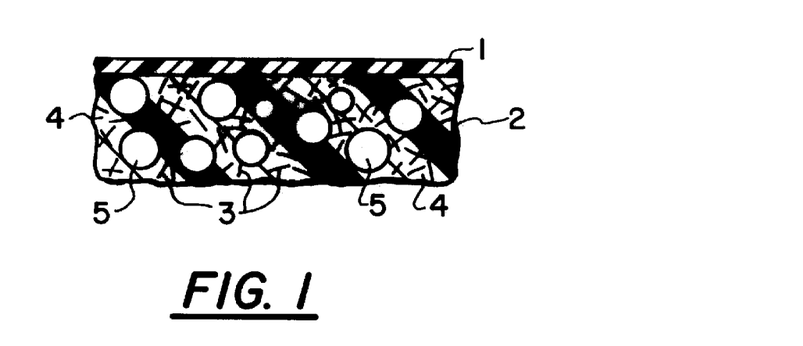
FIG. 1 is a schematic cross-sectional view of a conventional fiber-reinforced foamed resin article having a core layer with a cell structure.

The present inventors hypothesized that, in the conventional foamed resin article as illustrated in FIG. 1, the fibers exist in walls surrounding the cells. In this conventional structure, when the expansion ratio becomes too high and the walls become too thin, the walls are broken by the fibers and the cells become too large, thereby weakening the resultant article. Therefore, the expansion ratio of a foamed article reinforced by fibers with such average length should be low.

EXAMPLES

The present invention will be explained with reference of non-limiting Examples.

Test of Bending Rigidity of Fiber-Reinforced Articles

Bending rigidity of fiber-reinforced articles was measured by a three-point bending test method. The measurement was held under the following conditions:

test machine: Tension test machine DSS-2000 manufactured by Simadzu Corporation bending speed: 2 mm/min distance between two supporting points: 100 mm temperature of test piece: 23° C.

dimension of test piece: 30 mm×200 mm

A 200 mm long test piece was supported at two points, each point being positioned 50 mm inward from a respective end of the test piece, by supporting means of the test machine and a load was imparted to the center of the test piece. The load imparted at the time the test piece bent 1 mm was measured. The measurement was made twice for one fiber-reinforced article. The average of the two measurements was defined as the bending rigidity of the fiber-reinforced article.

Example 1

Figure 4:
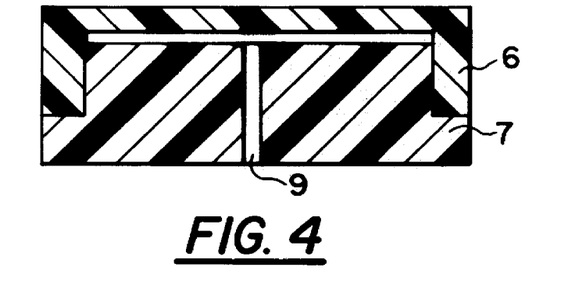
FIG. 4 shows the apparatus of FIG. 3 at a stage of a method for producing a fiber-reinforced article according to a first embodiment of the present invention.
Figure 6:
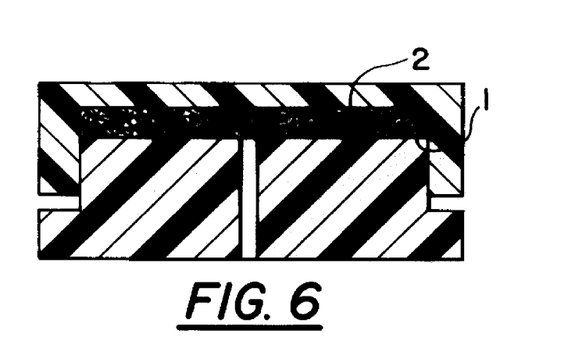
FIG. 6 shows the apparatus of FIG. 3 at still another stage of the method for producing a fiber-reinforced article according to the first embodiment of the present invention.

By using a molding apparatus whose schematic view is shown in FIG. 3 and according to a procedure illustrated in FIGS. 4–6 and discussed above, a fiber-reinforced article having thickness of 6 mm was obtained.

In this Example, pellets (manufactured by Sumitomo Chemical Co., Ltd.) comprising 30% by weight of glass fibers with average length of about 6 mm and polypropylene and 3% by weight (relative to the thermoplastic material) of a sodium bicarbonate-base foaming agent (Cellmic MB3062, manufactured by Sankyo Kasei Co.; decomposition temperature=180°–220° C.) were premixed and melt-kneaded in an in-line type injection machine to obtain a molten expandable composition comprising fibers with average length of 1.5 mm and having temperature of 240° C. As illustrated in FIGS. 4 and 5, the molten expandable composition 11 was supplied into a cavity defined between opposing mold surfaces of a first mold member 6 and a second mold member 7 through a resin feeding opening 10 which opens to a mold surface of the second mold member to fill the cavity. In this step, a cavity clearance (a distance between the opposing mold surfaces) was 3 mm.

0.5 seconds after completing the step of supplying the molten expandable composition to the cavity, the first mold member 6 was lifted to a predetermined position, so that a cavity with a cavity clearance of 6 mm was formed and the molten expandable composition expanded in the cavity, as shown in FIG. 6. The molten expandable composition was cooled for 60 seconds in the cavity to substantially solidify while the cavity clearance was maintained, and thereby a fiber-reinforced article was formed. The first mold member 6 was lifted and the thus formed fiber-reinforced article was removed from the molding apparatus.

Figure 11:
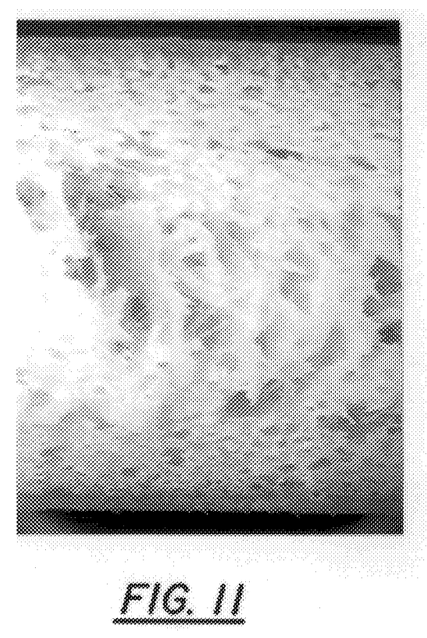
FIG. 11 is an enlarged view of a photograph of a cross section of a fiber-reinforced article obtained in Example 1.

The thus obtained fiber-reinforced article had two skin layers whose thickness was 0.2 mm respectively and an expanded core layer having a network structure. An enlarged photograph of a cross section of the fiber-reinforced article is shown in FIG. 11. The fiber-reinforced article also had an expansion ratio of about 2.

The bending rigidity of the fiber-reinforced article was 3.9 kgf/mm.

Example 2

By using a molding apparatus whose schematic view is shown in FIG. 3 and according to a procedure illustrated in FIGS. 7–9 and described above, a fiber-reinforced article having thickness of 6 mm was obtained.

Type and amount of pellets and a foaming agent used in this Example were the same as those used in Example 1.

As illustrated in FIG. 7, a molten expandable composition was supplied into a cavity with a cavity clearance of 5 mm through a resin feeding opening which opens to a mold surface of a second mold member. After completing the step of supplying the molten expandable composition to the cavity, a first mold member was lowered. When the cavity clearance became 3 mm, the cavity was filled with the molten expandable composition as shown in FIG. 8.

0.5 seconds after completing the step of filling the cavity with the molten expandable composition, the first mold member was lifted, so that the cavity clearance became 6 mm and the molten expandable composition expanded in the cavity as illustrated in FIG. 9.

The molten expandable composition was cooled for 60 seconds in the cavity to substantially solidify while the cavity clearance was maintained, and thereby a fiber-reinforced article was formed. The first mold member 6 was lifted and the thus formed fiber-reinforced article was removed from the molding apparatus.

The thus obtained fiber-reinforced article had two skin layers, each having a thickness of 0.2 mm, and an expanded core layer having a network structure. The fiber-reinforced article also had an expansion ratio of about 2.

Example 3

A fiber-reinforced article with a covering material laminated thereon was produced in the same manner as Example 2, except that a poly(vinyl chloride) sheet (a covering material 12) was supplied between the opposing mold surfaces before supplying the molten expandable composition into the cavity, as shown in FIG. 10.

The thus obtained fiber-reinforced article was 6 mm thick and had an expansion ratio of about 1.8. In the article, the covering material was laminated with one of two skin layers and the article had excellent appearance. The article had an expanded core layer and was excellent in bending rigidity.

Comparative Example 1

Production of a 6 mm thick fiber-reinforced article was attempted in the same manner as Example 1, except that the melt-kneading of the foaming agent and the pellets was conducted under such conditions to provide fibers with an average length of about 0.5 mm at a completion of melt-kneading.

Although 0.2 mm thick skin layers were formed on both sides of the article, the article was only 5 mm thick and a network structure was not formed sufficiently in the expanded core layer.

Comparative Example 2

An fiber-reinforced article was obtained in the same manner as Example 1, except that pellets (GHH 43, manufactured by Sumitomo Chemical Co., Ltd.) comprising 30% by weight of glass fibers with average length of about 0.3 mm and polypropylene were used. At completion of melt-kneading, the average length of the fibers was about 0.3 mm.

Although approximately 0.2 mm thick skin layers were formed on both sides of the article, the article was only about 5 mm thick and irregular in its thickness. A network structure was not formed sufficiently in the expanded core layer.

Comparative Example 3

A fiber-reinforced article was produced in the same manner as Comparative Example 2, except that, after completion of supplying the molten expandable composition, the first mold member was lifted so that a cavity clearance became 5 mm.

Figure 12:
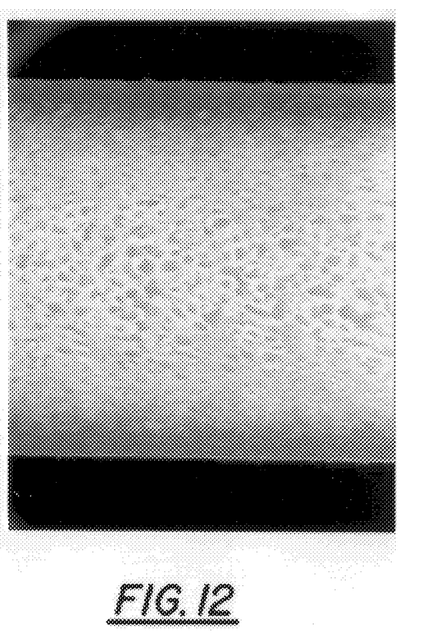
FIG. 12 is an enlarged view of a photograph of a cross section of a fiber-reinforced article obtained in Comparative Example 3.

A 5 mm thick fiber-reinforced article had 0.2 mm thick skin layers on both sides of the article. The core layer did not have a network structure, but a rough cell structure. An enlarged view of a photograph of a cross section of the fiber-reinforced article is shown in FIG. 12.

The bending rigidity of the fiber-reinforced article was 2.9 kgf/mm.

Fiber reinforced articles and a process for preparing the same are disclosed in Application No. 08-218289, which was filed in Japan on Aug. 20, 1996, the complete disclosure of which is incorporated herein by reference.

The foregoing detailed description of the preferred embodiments of the invention has been provided for the purposes of illustration and description. It is not intended to be exhaustive or to limit the invention to the precise embodiments disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A fiber-reinforced article comprising:

an expanded core layer having opposing first and second surfaces with a thickness defined therebetween, the expanded core layer being formed from a composition comprising a thermoplastic material and fibers with an average length of not less than about 1 mm, with at least a portion of the fibers being coated with the thermoplastic material, the fibers collectively defining a network structure in which the fibers are interconnected with each other and fixed relative to each other via the thermoplastic material so that the coated fibers define interstitial voids therebetween; and first and second skin layers, the first skin layer having a surface integrally connected to the first surface of the expanded core layer and the second skin layer having a surface integrally connected to the second surface of the expanded core layer, each of the two skin layers being formed from a composition comprising a thermoplastic material and fibers with an average length of not less than about 1 mm, wherein the fiber-reinforcing article has an average expansion ratio of from about 1.5 to about 3.5.

2. The fiber-reinforced article according to claim 1, further comprising a covering material laminated on at least a portion of at least one of the first and second skin layers.

3. The fiber-reinforced article according to claim 1, wherein the compositions respectively forming the skin layers and the expanded core layer each contain from about 10% to about 60% by weight of the fibers relative to a total weight of the fibers and the thermoplastic material.

4. The fiber-reinforced article according to claim 1, wherein the fibers in the compositions respectively forming the skin layers and the expanded core layer are glass fibers.

5. The fiber-reinforced article according to claim 1, wherein the fibers contained in the composition forming the expanded core layer have an average diameter in a range of from about 5 $\mu$m to about 30 $\mu$m.

6. The fiber-reinforced article according to claim 1, wherein the average length of the fibers contained in the composition forming the expanded core layer is in a range of from about 1 mm to about 50 mm.

7. The fiber-reinforced article according to claim 1, wherein the fiber-reinforced article has an average density in a range of from about 0.3 times to about 0.65 times an average density of the skin layer.

8. The fiber-reinforced article according to claim 1, wherein about 20% to 100% of the fibers in the composition forming the expanded core layer have a length of not less than about 3 mm.

9. The fiber-reinforced article according to claim 1, wherein the skin layers are substantially free of interstitial voids.

10. The fiber-reinforced article according to claim 1, wherein the interstitial voids are interconnected by at least one passage.

11. A method for producing a fiber-reinforced article, said method comprising the steps of:

(A) providing a molding apparatus having a first mold member and a second mold member, each of the mold members having a mold surface which opposes the mold surface of the other mold member, at least one of the mold members being movable relative to the other mold member;

(B) preparing a molten expandable composition comprising a thermoplastic material, fibers with average length of not less than about 1 mm, and a foaming agent;

(C) supplying the molten expandable composition to a cavity defined between the opposing mold surfaces, the cavity having a first volume during the supplying step, the first volume of the cavity being within a range of from about 0.3 times to about 0.65 times a predetermined volume of the fiber-reinforced article so that the cavity is filled with the molten expandable composition;

(D) moving at least one of the mold members to provide the cavity with a second volume that is equal to the predetermined volume of the fiber-reinforced article; and (E) maintaining the second volume of the cavity defined between the opposing mold surfaces so that the molten expandable composition is expanded to fill the cavity.

12. The method according to claim 11, wherein said step (B) comprises preparing the molten expandable composition by melt-kneading the foaming agent and a solid comprising the thermoplastic material and fibers, wherein the average length of the fibers is not less than about 3 mm.

13. The method according to claim 11, wherein said step (C) comprises maintaining the first volume of the cavity in a range of from about 0.3 times to about 0.65 times the predetermined volume of the fiber-reinforced article.

14. The method according to claim 11, wherein the molten expandable composition contains from about 10% to about 60% by weight of the fibers relative to a total weight of the fibers and the thermoplastic material.

15. The method according to claim 11, further comprising a step of placing a covering material on at least a portion of at least one of the opposing mold surfaces before conducting said step (C).

16. A method for producing a fiber-reinforced article, said method comprising the steps of:

(A) providing a molding apparatus having a female mold member and a male mold member, each of the mold members having a mold surface which opposes the mold surface of the other mold member, at least one of the mold members being movable relative to the other mold member;

(B) preparing a molten expandable composition comprising a thermoplastic material, fibers with an average length of not less than about 1 mm, and a foaming agent, a volume of the molten expandable composition being within a range of from about 0.3 times to about 0.65 times a predetermined volume of the fiber-reinforced article;

(C) supplying the molten expandable composition to the cavity defined between the opposing mold surfaces, the cavity having a first volume during the supplying step, the first volume of the cavity being larger than the volume of the molten expandable composition;

(D) moving at least one of the mold members so that a volume of the cavity is made the same as the volume of the molten expandable composition and the cavity is filled with the molten expandable composition;

(E) moving at least one of the mold members to provide the cavity with a second volume that is equal to the predetermined volume of the fiber-reinforced article; and (F) maintaining the second volume of the cavity defined between the opposing mold surfaces so that the molten expandable composition is expanded to fill the cavity.

17. The method according to claim 16, wherein said step (B) comprises preparing the molten expandable composition by melt-kneading the foaming agent and a solid comprising the thermoplastic material and fibers, wherein the average length of the fibers is not less than about 3 mm.

18. The method according to claim 16, wherein said step (C) comprises maintaining the first volume of the cavity in a range of from about 0.3 times to about 0.65 times the predetermined volume of the fiber-reinforced article.

19. The method according to claim 16, wherein the molten expandable composition contains from about 10% to about 60% by weight of the fibers relative to a total weight of the fibers and the thermoplastic material.

20. The method according to claim 16, further comprising a step of placing a covering material on at least a portion of at least one of the opposing mold surfaces before conducting said step (C).

21. The fiber-reinforced article according to claim 1, wherein the fiber-reinforced article is obtained by a method comprising the following steps of:

(A) providing a molding apparatus having a first mold member and a second mold member, each of the mold members having a mold surface which opposes the mold surface of the other mold member, at least one of the mold members being movable relative to the other mold member;

(B) preparing a molten expandable composition comprising a thermoplastic material, fibers with average length of not less than about 1 mm, and a foaming agent;

(C) supplying the molten expandable composition to a cavity defined between the opposing mold surfaces, the cavity having a first volume during the supplying step, the first volume of the cavity being within a range of from about 0.3 times to about 0.65 times a predetermined volume of the fiber-reinforced article so that the cavity is filled with the molten expandable composition;

(D) moving at least one of the mold members to provide the cavity with a second volume that is equal to the predetermined volume of the fiber-reinforced article; and (E) maintaining the second volume of the cavity defined between the opposing mold surfaces so that the molten expandable composition is expanded to fill the cavity.

22. The fiber-reinforced article according to claim 21, wherein the fibers in the expanded core layer have respective first and second ends with respective imaginary lines passing therebetween, a majority of the imaginary lines of the fibers in the expanded core layer being arranged not more than 45 degrees relative to a direction in which at least one mold was moved in said step (D).

23. The fiber-reinforced article according to claim 1, wherein the fiber-reinforced article is obtained by a method comprising the following steps of:

(A) providing a molding apparatus having a female mold member and a male mold member, each of the mold members having a mold surface which opposes the mold surface of the other mold member, at least one of the mold members being movable relative to the other mold member;

(B) preparing a molten expandable composition comprising a thermoplastic material, fibers with an average length of not less than about 1 mm and a foaming agent, a volume of the molten expandable composition being within a range of from about 0.3 times to about 0.65 times a predetermined volume of the fiber-reinforced article;

(C) supplying the molten expandable composition to the cavity defined between the opposing mold surfaces, the cavity having a first volume during the supplying step, the first volume of the cavity being larger than the volume of the molten expandable composition;

(D) moving at least one of the mold members so that a volume of the cavity is make the same as the volume of the molten expandable composition and the cavity is filled with the molten expandable composition;

(E) moving at least one of the mold members to provide the cavity with a second volume that is equal to the predetermined volume of the fiber-reinforced article; and (F) maintaining the second volume of the cavity defined between the opposing mold surfaces so that the molten expandable composition is expanded to fill the cavity.

24. The fiber-reinforced article according to claim 23, wherein the fibers in the expanded core layer have respective first and second ends with respective imaginary lines passing therebetween, a majority of the imaginary lines of the fibers in the expanded core layer being arranged not more than 45 degrees relative to a direction in which at least one mold was moved in said step (E).

* * * * *